US005843359A

United States Patent [19]

Kudo et al.

[11] Patent Number: 5,843,359

[45] Date of Patent: Dec. 1, 1998

[54] METHOD OF MANUFACTURING A CASE FOR ELECTRONIC COMPONENT

[75] Inventors: Yasuchika Kudo, Osaka; Yusho Nakase, Fukui; Yasuo Kuboki, Osaka, all of Japan

[73] Assignee: Matsushita Electric Industrial Co., Ltd., Osaka, Japan

[21] Appl. No.: 754,831

[22] Filed: Nov. 22, 1996

[30] Foreign Application Priority Data

Nov. 24, 1995 [JP] Japan .................................... 7-305425

[51] Int. Cl.[6] ............................ B29C 45/14; B29C 70/72

[52] U.S. Cl. .................... 264/263; 264/272.11; 264/275; 264/277

[58] Field of Search .......................... 264/272.11, 272.14, 264/272.15, 275, 277, 278, 263, 271.1

[56] References Cited

U.S. PATENT DOCUMENTS

| | | | |
|---|---|---|---|
| 4,259,557 | 3/1981 | Takano | 200/275 |
| 4,448,265 | 5/1984 | Kodal et al. | 264/272.15 |
| 4,618,467 | 10/1986 | Burger et al. | 264/271.1 |
| 4,803,030 | 2/1989 | Kobayashi | 264/278 |
| 5,024,798 | 6/1991 | Cloud et al. | 264/272.15 |
| 5,056,214 | 10/1991 | Holt | 264/272.15 |
| 5,259,778 | 11/1993 | Zhang | 439/188 |
| 5,278,531 | 1/1994 | Link et al. | 335/202 |

*Primary Examiner*—Angela Ortiz
*Attorney, Agent, or Firm*—McDermott, Will & Emery

[57] ABSTRACT

An insulating case that has contact members 21A, 21B, which are fixed to contact member holding boards 26A, 26B by pushing-in the members into respective holes 27A, 27B of the boards and caulking the members to the boards. A tray 29 is formed by an insert-molding process with insulating resin with the contact member holding boards 26A, 26B fixed in the bottom of the tray 29, with the terminals 23A, 23B extending outside the tray, while the contact parts 22A, 22B extend upward from the inside of the bottom of the tray.

4 Claims, 5 Drawing Sheets

METHOD OF MANUFACTURING A CASE FOR ELECTRONIC COMPONENT

FIELD OF THE INVENTION

The present invention relates to a method of manufacturing an insulating case comprising contact members with terminals, which case can be used as a switch and other electronic components.

BACKGROUND OF THE INVENTION

A method of manufacturing a prior art case used as a switch is described hereunder referring to FIG. 5, a perspective view, and FIGS. 6 and 7, both cross sectional views.

In a box-shape case or tray 1 made of thermosetting resin having a square hole 2A and a square hole 2B, a contact member 3A having a contact part (contact stud) 4A at the top and a terminal 5A at the bottom, and another contact member 3B having a contact part (movable contact member holding section) 4B at the top and a terminal 5B at the bottom, are inserted, respectively, into the holes 2A, 2B from the inside of the case 1 as deep as the middle steps 6A and 6B. Then, caulking steps 7A and 7B, which extend outside the case 1 are spread for caulking, as shown in FIGS. 6(*a*) and 6(*b*). The contact members 3A and 3B are fixed to the case 1 by the caulking work. Further, a bonding agent 8 is applied around the caulking steps 7A and 7B and the square holes 2A and 2B, and hardened, in order to prevent soldering flux, which is used when connecting a lead wire (not shown) to the terminals 5A and 5B, from infiltrating through the gap of the square holes 2A and 2B to the contact parts 4A and 4B.

Then, as shown in FIG. 7, a movable contact member 9 is coupled on the hollow of the movable contact member holding section 4B from the top opening of case 1. An operating rod 11 comprising an elastic arm 10 is provided, pressing the movable contact member 9 from above. Finally, a lid 12 is fixed on the case 1. A switch in a case is thus completed.

Along with the recent trends towards smaller and lower cost electronic appliances, electronic components constituting such appliances are strongly requested to be compact and inexpensive. A case for an electronic component, as described above, however, requires additional processing steps for applying and hardening the bonding agent 8 in order to prevent the infiltration of flux, which results in an extra cost for additional manufacturing processes. Furthermore, the terminals 5A, 5B require an extra length corresponding to the area needed for applying the bonding agent 8. This creates an extra height to the overall height of an electronic component.

Meanwhile, if one intends to manufacture a box-shaped case 1 comprising the above described contact members 3A and 3B by an insert-molding method with an aim to increase the productivity and reduce the cost, use of very complicated molds is inevitable for holding the contact members 3A and 3B, because the contact parts 4A and 4B are larger than the part to be buried into the square holes 2A and 2B. Furthermore, if possible slanting of the contact member caused by softening of the bottom of case 1 due to heat applied when soldering a lead wire is to be avoided, the case 1 needs to be made with a thermosetting resin. The thermosetting resin does not fit to an insert-molding method employing molds of a very complicated structure. Therefore, it was very difficult to manufacture the above described box-shape case 1 having contact members 3A and 3B through an insert-molding method.

SUMMARY OF THE INVENTION

The present invention is intended to present a method of manufacturing a case for an electronic component that is suitable for reducing the overall size of the case, as well as the cost of the case.

According to the present method of manufacturing a case for an electronic component, a contact member, comprising a contact part at the top and a terminal part at the bottom, is fixed perpendicularly to a contact member holding board, which is made of metal, by pushing the contact member into the board's hole and caulking. Then, the contact member holding board is insert-molded with the board placed at the bottom of a box case or tray whose top is open. In this way, a case for an electronic component is produced, in which only the terminal of the contact member extends outside the case while the contact part is located inside the case.

Through a manufacturing method according to the present invention, a case for an electronic component in which a contact member having a contact part is fixed at the bottom is easily available by insert-molding method, without necessitating molds of complicated construction.

BRIEF DESCRIPTION OF THE DRAWINGS

FIG. 1(*a*) is a perspective view showing the appearance of a contact member and a contact member holding board.

FIG. 1(*b*) is a perspective view showing the contact member fixed on the contact member holding board.

FIG. 1(*c*) is a perspective view showing a part of the case for a switch mounted with the contact member.

FIG. 5 is an exploded perspective view of the case.

FIG. 6(*a*) is a lengthwise cross sectional view of the case.

FIG. 6(*b*) is a cross sectional view at A—A of FIG. 6(*a*).

FIG. 7 is a cross sectional view showing a state of the case with switching members assembled therein.

DESCRIPTION OF THE PREFERRED EMBODIMENTS

A case for a switch comprising two contact members is described hereunder as one of the preferred embodiments of the present invention, by referring to FIGS. 1 through 4.

Two pieces of contact members 21A and 21B are made of a metal plate having good electro-conductivity, such as copper, brass. The contact member holding boards 26A and 26B are made of iron or another metal plate having the same thickness as the contact members 21A, 21B. Contact member 21A comprises a contact part (contact stud) 22A at the top, and a terminal part 23A at the bottom. Contact member 21B comprises a contact part (contact member holding part) 22B at the top, and a terminal part 23B at the bottom. Between the contact parts 22A, 22B and the terminal parts 23A, 23B, there are middle steps 24A, 24B for acting as stoppers when pushing-in the contact members, and there are caulking steps 25A, 25B.

Figure 1A:
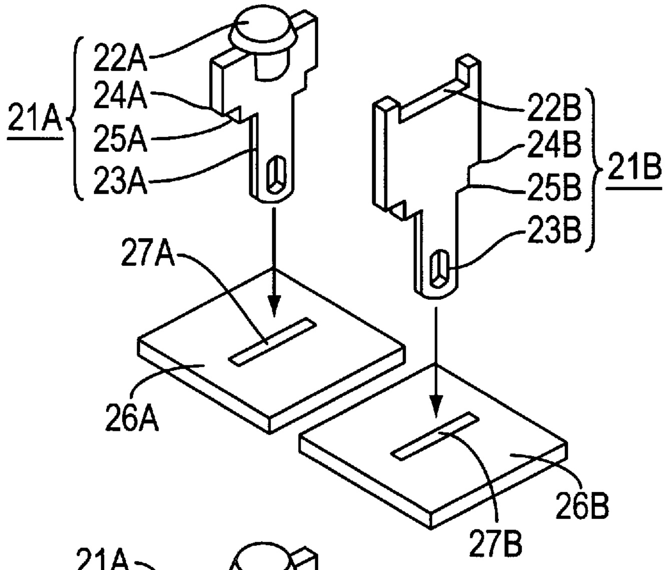
FIGS. 1(*a*)–1(*c*) through 4 are for explaining one of the preferred embodiments of the present invention according to a method of manufacturing a case or tray for an electronic component.
Figure 1B:
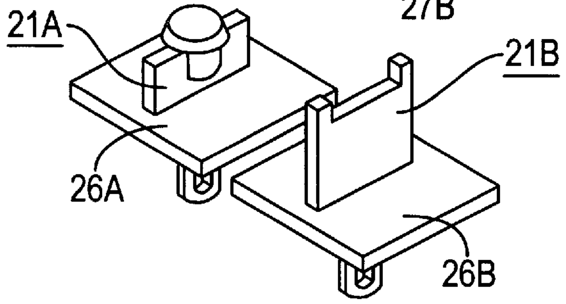
Figure 1C:
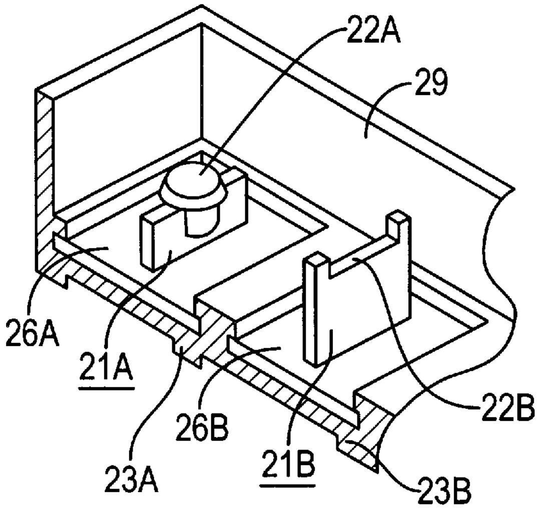
Figure 2:
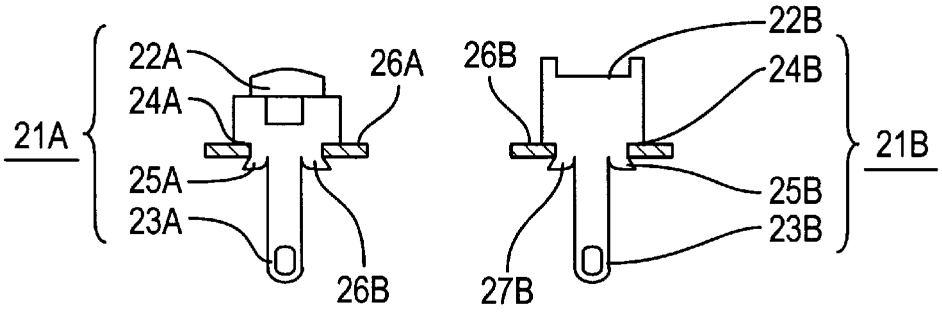
FIG. 2 is a cross sectional view showing the contact member fixed to the contact member holding board.

As the first processing step, contact members 21A and 21B are pushed into the holding holes 27A and 27B, respectively, of the contact member holding boards 26A and 26B, respectively, down to the steps 24A and 24B, respectively, as shown in FIG. 1(*b*). Then, as shown in FIG. 2, caulking steps 25A and 25B extending out from the rear surface of the contact member holding boards 26A and 26B, respectively, are caulked. Through the process steps of pushing-in and caulking, the contact members 21A and 21B are fixed perpendicularly to the contact member holding boards 26A and 26B, respectively.

Figure 3:
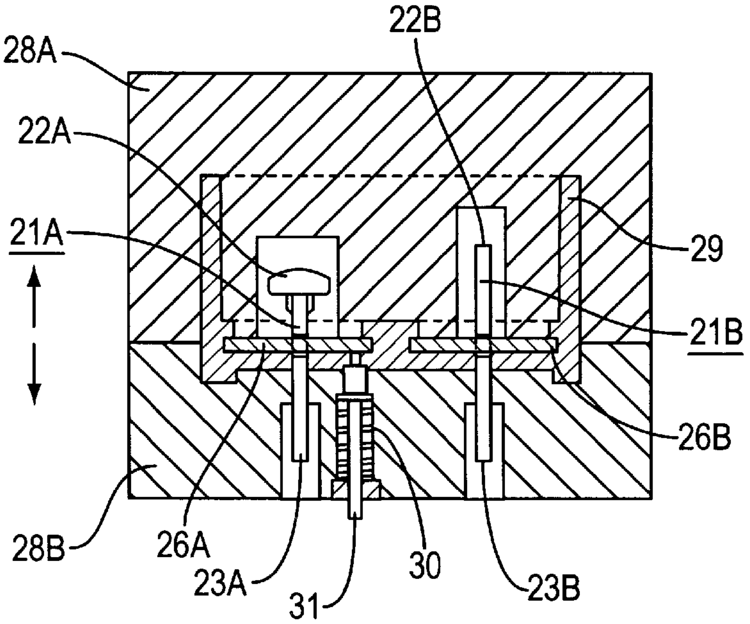
FIG. 3 is a cross sectional view of moulds used for insert-molding.
Figure 4:
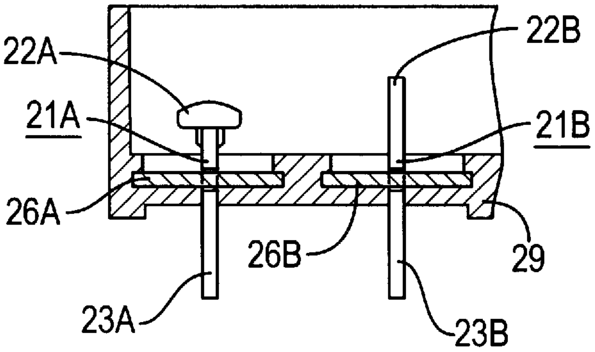
FIG. 4 is a cross sectional view showing a part of the case for a switch having contact members.
Figure 5:
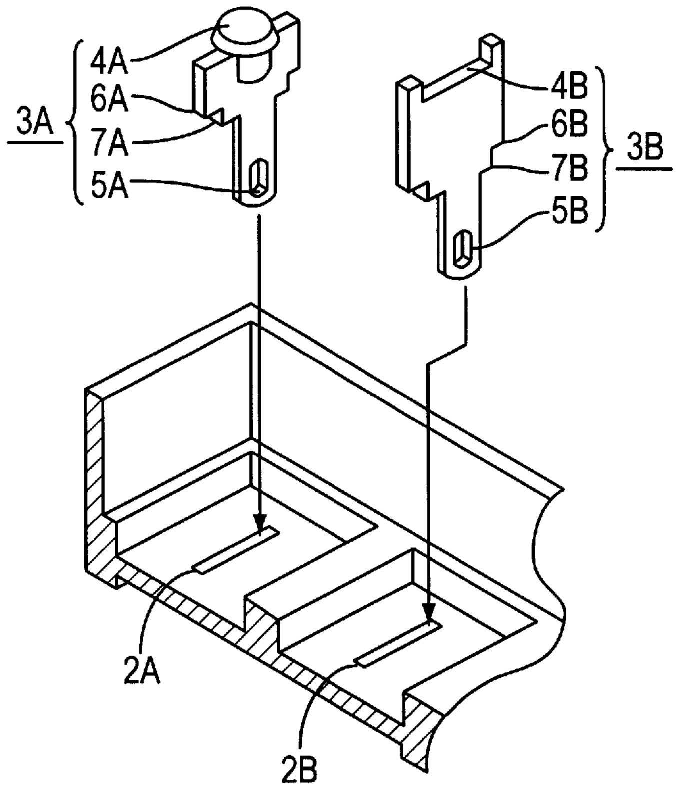
FIG. 5 PRIOR ART
FIGS. 5 through 7 are for explaining a prior art method of manufacturing a case for an electronic component.
Figure 6A:
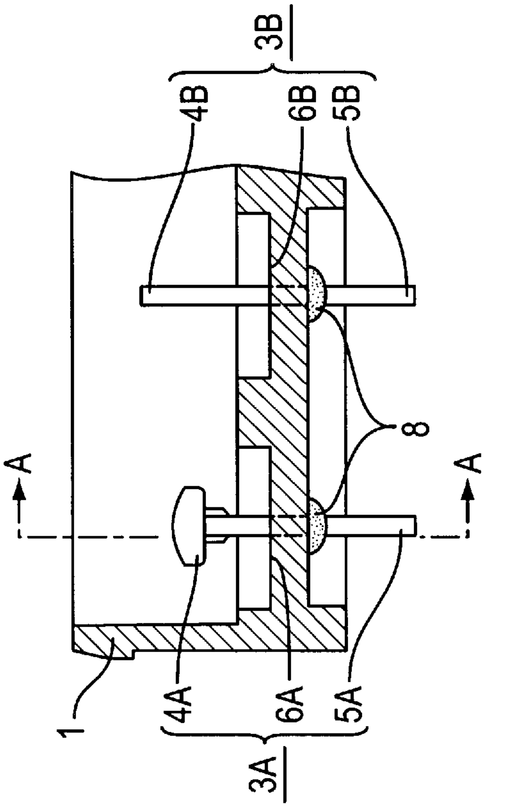
FIG. 6(A) PRIOR ART
Figure 6B:
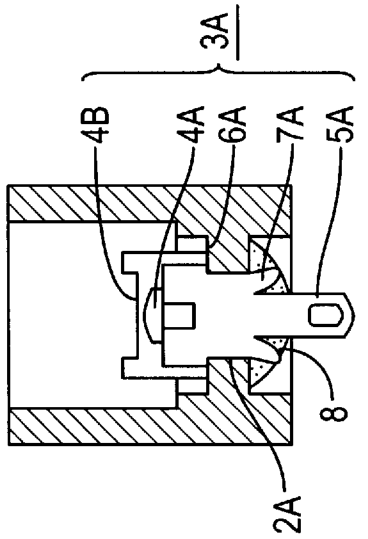
FIG. 6(B) PRIOR ART

As shown in FIG. 3, the contact member holding boards 26A and 26B, having respectively the contact members 21A and 21B, are placed, providing an insulating distance, vertically between molds 28A and 28B, to be insert-molded with a thermoplastic insulation resin. Through the above insert-molding process, a box-shaped case or tray 29 for a switch is produced, wherein the contact member holding boards 26A and 26B are fixed at the bottom, with contact parts 22A and 22B, respectively, located inside the walls of the tray, while terminals 23A and 23B, respectively, extend outside the bottom of the tray, as shown in FIG. 1(*c*) and FIG. 4.

Figure 7:
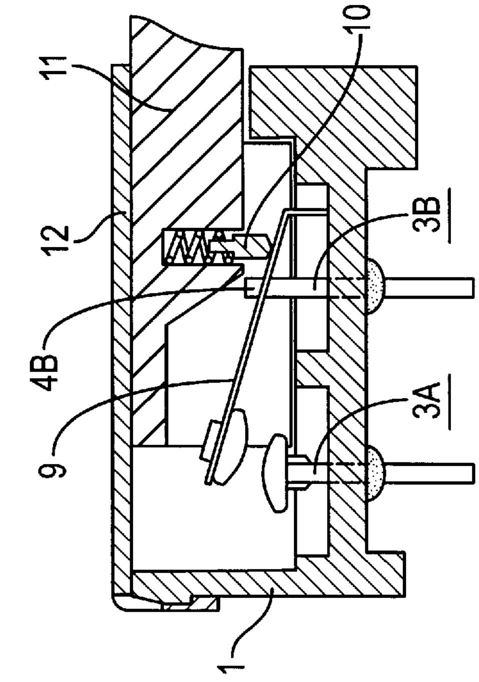
FIG. 7 PRIOR ART

For completing a switch within the case or tray 29, a movable contact member and an operating rod are assembled in the case 29, and then the top opening of the case 29 is closed with a lid, in the same way as in the prior art case shown in FIG. 7.

As shown in FIG. 3, a press pin(s) 31 is provided in the mold 28B for holding the contact member holding boards 26A and 26B in place. Pin 31 is equipped with a spring 30, so that the pin 31 is pushed back to the outside of mold 28B by the pressure of resin injected into the mold. By this constitution, the holding boards 26A and 26B are prevented from being left exposed due to no supply of resin at an area corresponding to the press pin 31, after the insert molding is finished. It is therefore preferred to use a press pin 31 equipped with spring 30.

The thickness of contact members 21A and 21B and the thickness of contact member holding boards 26A and 26B should preferably be identical to each other, in view of the processing ease during pushing-in and caulking, as well as the mold life and cost. In a case where the thickness of the contact members 21A and 21B are too small relative to the thickness of the contact member holding boards 26A and 26B, the width of the holding holes 27A and 27B becomes very small, making the push-in work difficult. On the other hand, if contact members 21A and 21B are thick and the contact member holding boards 26A and 26B are thin, the contact member becomes costly and the strength of the contact member holding boards becomes weak. Therefore, it is preferred that the thickness of the two sets of items are almost identical.

Because the invented method of manufacturing a case for an electronic component consists of the contact member being placed on molds in a state wherein a contact member is attached to a contact member holding board, the structure of the molds may be simplified. T his enables manufacturing the case by using an insert-molding process. Therefore, volume production of the cases at a lower cost becomes easy. The effectiveness of the invented method becomes especially significant when manufacturing a case for an electronic component in which a plurality of contact members, being insulated from each other, are disposed at the bottom. In the invented method, the structure of the molds is quit e simplified and the manufacturing becomes much easier as compared with prior art production methods.

In a manufacturing method according to the present invention, the contact member is fixed to the contact member holding board by a push-in method, and the contact member holding board is fixed to the bottom of a case by an insert-molding process. Therefore, the contact part and the terminal part are separated by the contact member holding board and the bottom of the case. This avoids the infiltration of flux to the contact part when soldering a lead wire to terminal. As a result, the application of a bonding agent around the terminal becomes unnecessary. Furthermore, a section corresponding to the area for applying a bonding agent can be eliminated, and the bottom thickness of a case can be made thinner as the contact member holding board plays an enforcement role. These altogether contribute to make the overall size of a case smaller. As the contact member holding board works also as a heat radiating board, the possible tilting of a contact member caused by a softened case bottom due to soldering heat is prevented even if a thermoplastic material is used for the case.

Although the present invention has been described in terms of the presently preferred embodiment, it is to be understood that such disclosure is not to be interpreted as limiting. Various alterations and modifications will no doubt become apparent; for example, besides the thermoplastic resin, a thermosetting resin may be used for the case. The invented method may be utilized also for manufacturing other types of cases, besides a case for switch. For example, an electronic component comprising different kinds of terminals can be manufactured according to the present invention. Accordingly, it is intended that the appended claims be interpreted as covering all alterations and modifications that fall within the true spirit and scope of the invention.

What is claimed is:

1. A method of manufacturing a case for an electronic component comprising the steps of:

fixing a contact member having a contact part at the top and a terminal part at the bottom perpendicularly to a contact member holding board made of metal and having a hole, by pushing said contact member into the hole of said contact member holding board, and by caulking a middle part of said contact member to a surface of said contact member holding board; and forming a tray having an opening facing upward from insulating resin by insert-molding so that said surface of said contact member holding board is fixed to an upper surface of the tray, with said terminal part extending downward from a lower surface of said tray while said contact part extends upward from said upper surface of said tray.

2. The method of manufacturing a case for an electronic component by insert-molding as claimed in claim 1, wherein a plurality of said contact member holding boards on which a respective plurality of contact members are attached is provided, and wherein said plurality of contact member holding boards are disposed relative to each other in an insulated manner.

3. The method of manufacturing a case for an electronic component as claimed in claim 1, wherein said contact member and said contact member holding board are made of sheet metal, and wherein the thicknesses of which are identical.

4. The method of manufacturing a case for an electronic component as claimed in claim 2, wherein said plurality of contact members and said respective plurality of contact member holding boards are made of sheet metal, and wherein the thicknesses of which are identical.

* * * * *